US006822719B2

(12) United States Patent
Song et al.

(10) Patent No.: US 6,822,719 B2
(45) Date of Patent: Nov. 23, 2004

(54) LIQUID CRYSTAL DISPLAY DEVICE HAVING PAD CONFIGURATION AND METHOD FOR MANUFACTURING THE SAME

(75) Inventors: Hyun Ho Song, Kyongsangbuk-do (KR); Cheol Woo Park, Taegu-kwangyokshi (KR)

(73) Assignee: LG. Phillips LCD Co., Ltd., Seoul (KR)

( * ) Notice: Subject to any disclaimer, the term of this patent is extended or adjusted under 35 U.S.C. 154(b) by 82 days.

(21) Appl. No.: 10/145,896

(22) Filed: May 16, 2002

(65) Prior Publication Data

US 2002/0176045 A1 Nov. 28, 2002

(30) Foreign Application Priority Data

May 25, 2001 (KR) ...................................... P2001-28978

(51) Int. Cl.⁷ ....................... G02F 1/1345; G02F 1/136; H01L 29/04
(52) U.S. Cl. .................. 349/151; 349/43; 349/149; 349/152; 257/59
(58) Field of Search ............................... 349/149–152, 349/43; 257/59, 72

(56) References Cited

U.S. PATENT DOCUMENTS

| 6,198,519 | B1 | * | 3/2001 | Chang ........................ 349/129 |
| 6,583,845 | B1 | * | 6/2003 | Chung et al. ............... 349/150 |
| 2001/0026345 | A1 | * | 10/2001 | Park et al. ................... 349/149 |
| 2002/0003590 | A1 | * | 1/2002 | Ko et al. ...................... 349/54 |
| 2002/0044246 | A1 | * | 4/2002 | Moon et al. ................. 349/141 |

* cited by examiner

*Primary Examiner*—Tarifur R. Chowdhury
(74) *Attorney, Agent, or Firm*—Morgan, Lewis & Bockius LLP

(57) ABSTRACT

A liquid crystal display device includes a first substrate, a second substrate opposing the first substrate, a plurality of gate lines and a plurality of data lines on the first substrate, each of the gate lines crossing each of the data lines at a crossing point, a plurality of gate pads, each gate pad disposed at a first end of each gate line, a plurality of data pads, each data pad disposed at a first end of each data line, a dummy portion between the pads, the dummy portion having a same pattern as a pattern of the plurality of gate pads and a pattern of the plurality of data pads, a plurality of thin film transistors disposed at the cross point, a first alignment layer on the first substrate, and a liquid crystal layer between the first substrate and the second substrate.

21 Claims, 5 Drawing Sheets

LIQUID CRYSTAL DISPLAY DEVICE HAVING PAD CONFIGURATION AND METHOD FOR MANUFACTURING THE SAME

The present invention claims the benefit of Korean Patent Application No. P2001-28978 filed in Korea on May 25, 2001, which is hereby incorporated by reference.

BACKGROUND OF THE INVENTION

1. Field of the Invention

The present invention relates to a liquid crystal display device and a method for manufacturing the same, and more particularly, to a liquid crystal display device and a method for manufacturing the same in which a uniform alignment film is formed.

2. Discussion of the Related Art

FIG. 1 is a cross sectional view of a liquid crystal display device according to the related art. In FIG. 1, the liquid crystal display device includes a liquid crystal display panel 10, a light source 20, and a driving circuit 30. The liquid crystal display panel 10 includes an upper substrate 1 and a lower substrate 2 opposed to each other at a constant interval with a liquid crystal layer 3 interposed therebetween. The upper substrate 1 includes a black matrix layer 4 and a color filter layer 5. The lower substrate 2 includes a plurality of gate lines and a plurality of data lines, a pixel electrode, and a thin film transistor (TFT). The gate lines and the data lines are arranged at constant intervals along first and second directions. The intersection of a gate line and a data line defines a pixel region. The pixel electrode and the TFT are formed in the pixel region.

FIG. 2 is a plane view of the lower substrate shown in FIG. 1, and FIG. 3 is an enlarged view of a pad of the lower substrate shown in FIG. 1. In FIGS. 2 and 3, each of the gate and data lines of the pixel region 60 are electrically connected to a driving circuit 30, thereby providing a signal to each of the gate and data lines. Gate pads 40 and 50 electrically interconnect each of the gate lines to the driving circuit 30, and data pads 40-1 and 50-1 electrically interconnect each of the data lines to the driving circuit 30.

A method for manufacturing a liquid crystal display panel according to the related art will now be described.

During processing of a TFT substrate (a lower substrate), a gate electrode, a gate line, and a gate pad are formed at an end of the gate line on a substrate, and a gate insulating film is formed thereupon. A semiconductor layer and an ohmic contact layer are formed on the gate insulating film. The semiconductor layer and the ohmic contact layer are used as channels of the thin film transistor. Source and drain electrodes are formed on the ohmic contact layer. A data line is formed to cross the gate line, and a data pad is formed at an end of the data line. A pixel electrode is formed to electrically connect with the drain electrode, thereby forming the TFT substrate.

During processing of a color filter substrate (a upper substrate), a black matrix layer is formed on a substrate, and color filter layers of R, G, and B are formed on the black matrix layer. The black matrix layer prevents light from being transmitted to a region other than the pixel electrode. Then, a common electrode is formed on the color filter layers to supply a voltage to the liquid crystal layer, thereby forming the color filter substrate. Thereafter, both the lower and upper substrates are attached to each other, and a liquid crystal is injected therebetween, thereby forming a liquid crystal cell.

Display characteristics such as light transmissivity, response time, viewing angle, and contrast, for example, of a liquid crystal display device are dependent upon an arrangement of liquid crystal molecules. Accordingly, an alignment film 7 is formed on the lower and upper substrates to uniformly control alignment of the liquid crystal molecules. In general, the alignment film 7 is formed by depositing, hardening and rubbing an alignment material. For example, a polyimide or polyamide based material is deposited on the lower and upper substrate, and hardened. Then, the hardened material is rubbed with a rubbing cloth attached to a rotating drum to form a fine groove, thereby aligning the liquid crystal molecules.

However, the related art liquid crystal display device according to the related art has several problems. For example, a step difference occurs in the lower substrate between a region where the pads 40 and 40-1 are formed and a region C where no pads are formed, as shown in FIG. 3. The region where the pads 40 and 40-1 are formed is higher than the region C. Accordingly, during the rubbing process of the lower substrate, an abnormal portion is created in the rubbing cloth due to the step difference. For this reason, a spot is generated in the alignment film by the rubbing cloth. Specifically, a relatively high pretilt angle is formed in the alignment film when rubbed with a rubbing cloth having the abnormal portion as compared to an alignment film rubbed with a rubbing cloth not having the abnormal portion. A liquid crystal display device having an alignment film with a relatively high pretilt angle has low threshold voltage characteristics when driven. Accordingly, the low threshold voltage characteristics result in abnormal display portions, thereby degrading display characteristics of the liquid crystal display device.

SUMMARY OF THE INVENTION

Accordingly, the present invention is directed to a liquid crystal display device and a method for manufacturing the same that substantially obviates one or more problems due to limitations and disadvantages of the related art.

An object of the present invention is to provide a liquid crystal display device and a method for manufacturing the same, in which a spot of an alignment film generated during a rubbing process is removed, so that the alignment film is uniformly formed.

Additional features of the invention will be set forth in part in the description which follows, and in part will become apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display device includes a first substrate, a second substrate opposing the first substrate, a plurality of gate lines and a plurality of data lines on the first substrate, a plurality of gate pads, each gate pad disposed at a first end of each gate line, a plurality of data pads, each data pad disposed at a first end of each data line, a dummy portion between the pads, the dummy portion having a same pattern as a pattern of the plurality of gate pads and a pattern of the plurality of data pads, a plurality of thin film transistors at a cross point of the gate and data lines, a first alignment layer on the first substrate, and a liquid crystal layer between the first substrate and the second substrate.

In another aspect, a method for manufacturing a liquid crystal display device includes forming a gate electrode, a plurality of gate lines, a plurality of gate pads, and dummy portions on a first substrate, each dummy portion having a pattern similar to a pattern of the plurality of gate pads in a region between the plurality of gate pads, forming a gate insulating film on the first substrate, forming a semiconductor layer and a ohmic contact layer on the gate insulating film, forming a source and drain electrode, a plurality of data lines, and a plurality of data pads on the first substrate, forming a passivation film on the first substrate, forming pixel electrodes on the passivation film, and forming a first alignment layer on the first substrate.

In another aspect, a method for manufacturing a liquid crystal display device, includes forming a gate electrode, a plurality of gate lines, and a plurality of gate pads on a first substrate, forming a gate insulating film on a first substrate, forming a semiconductor layer and a ohmic contact layer on the gate insulating film, forming source and drain electrodes, a plurality of data lines crossing the plurality of gate lines, a plurality of data pads, and a plurality of dummy portions, each dummy portion having a pattern similar to a pattern of the plurality of data pads in regions between the plurality of data pads, forming a passivation film on the first substrate, forming a pixel electrode on the passivation film, and forming a first alignment layer on the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 5A:
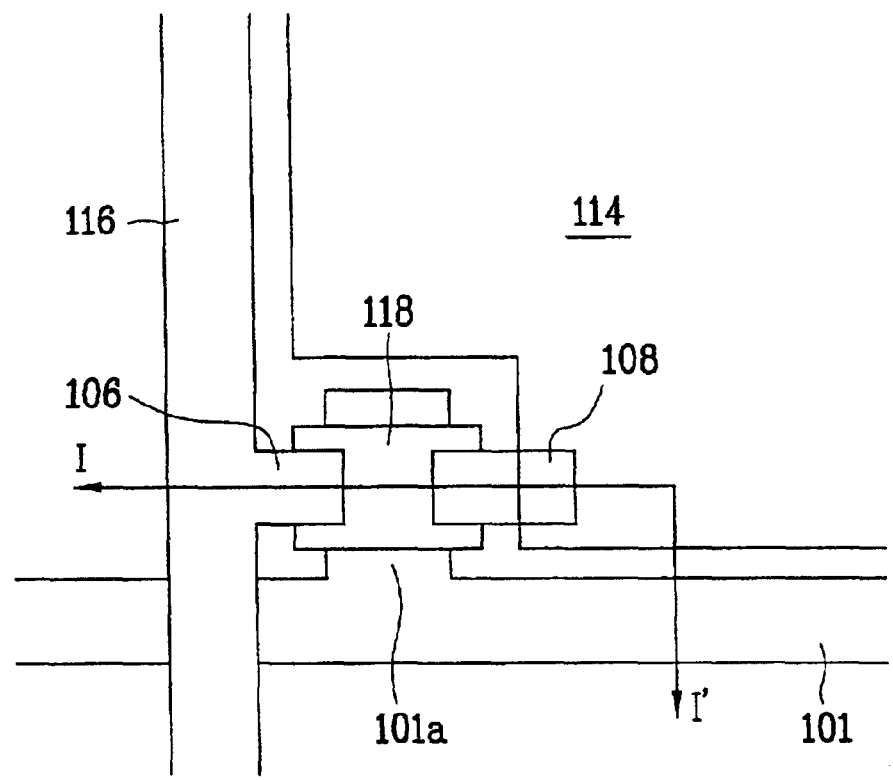
FIG. 5A is a plane view illustrating a pixel region of a lower substrate of an exemplary liquid crystal display device according to the present invention.
Figure 5B:
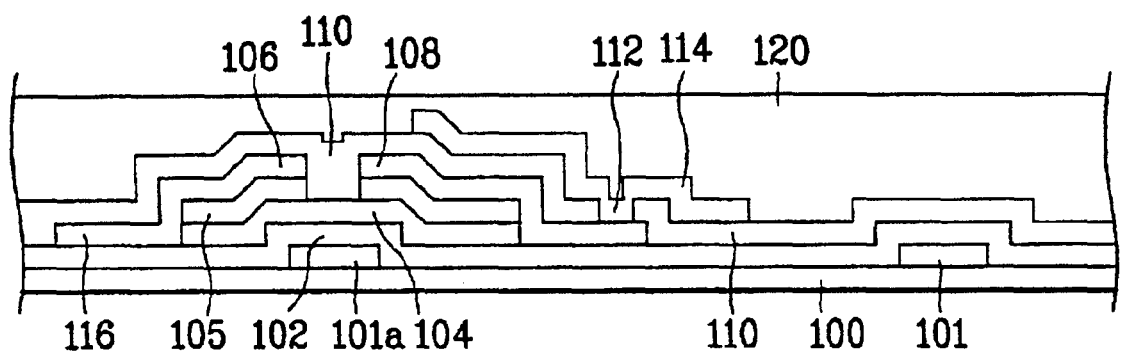
FIG. 5B is a cross sectional view taken along I–I' of FIG. 5A according to the present invention.

FIG. 5A is a plane view illustrating a pixel region of a lower substrate of an exemplary liquid crystal display device according to the present invention, and FIG. 5B is a cross sectional view taken along I–I' of FIG. 5A. In FIG. 5A, a plurality of gate lines 101 and a plurality of data lines 116 may be formed on a first substrate along first and second directions to cross each other. A plurality of thin film transistors 118 may be formed in a portion where the gate line 101 crosses the data line 116. Each of the thin film transistors 118 may be formed on a first substrate 100, as shown in FIG. 5B, and may include a gate electrode 101a electrically connected to the gate line 101, a gate insulating film 102 formed on an entire surface of the first substrate 100 including the gate electrode 101a, a semiconductor layer 104 and an ohmic contact layer 105 formed on the gate insulating film 102, and source and drain electrodes 106 and 108 formed on the ohmic contact layer 105.

Figure 1:
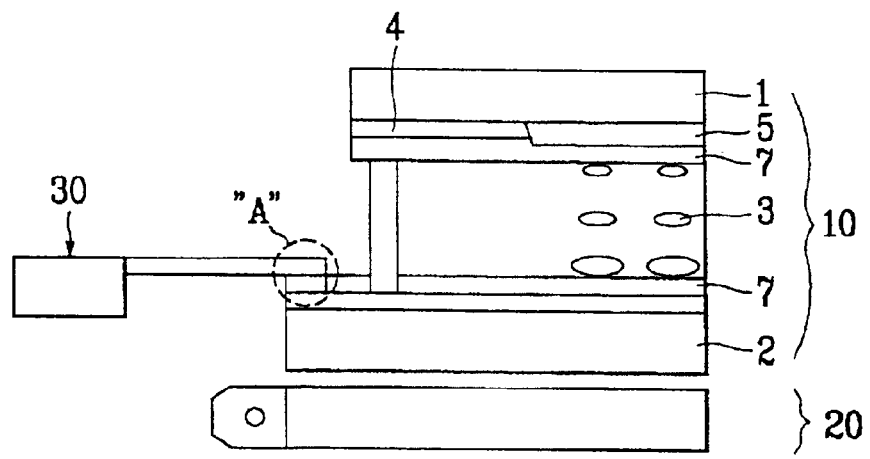
FIG. 1 is a cross sectional view of a liquid crystal display device according to the related art.
Figure 2:
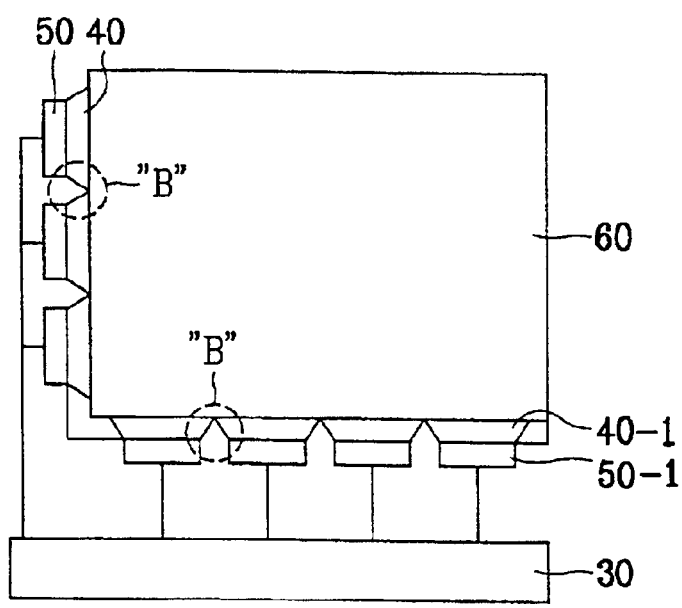
FIG. 2 is an enlarged plane view of a portion "A" of FIG. 1 according to the related art.
Figure 3:
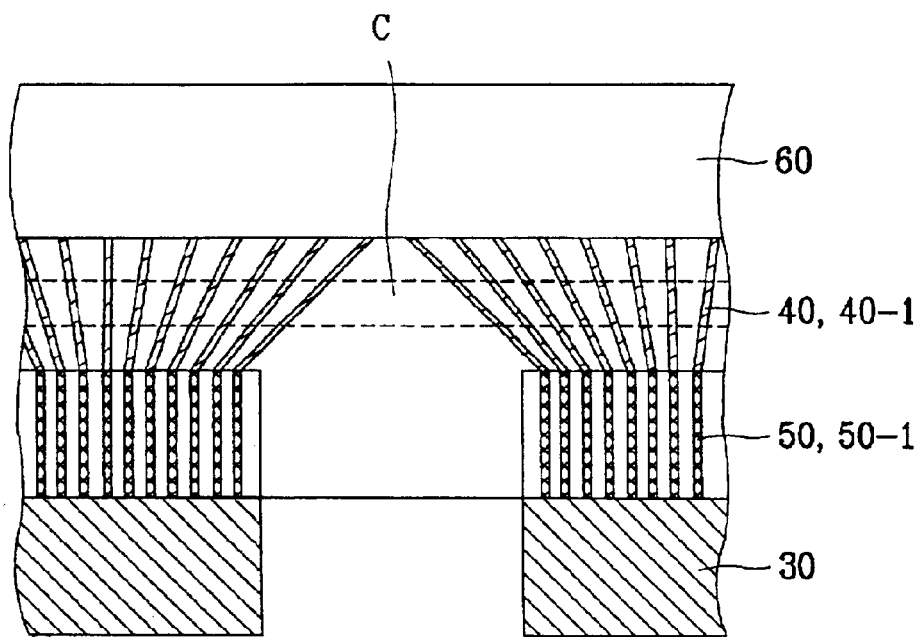
FIG. 3 is an enlarged view of a portion "B" of FIG. 2 according to the related art.
Figure 4:
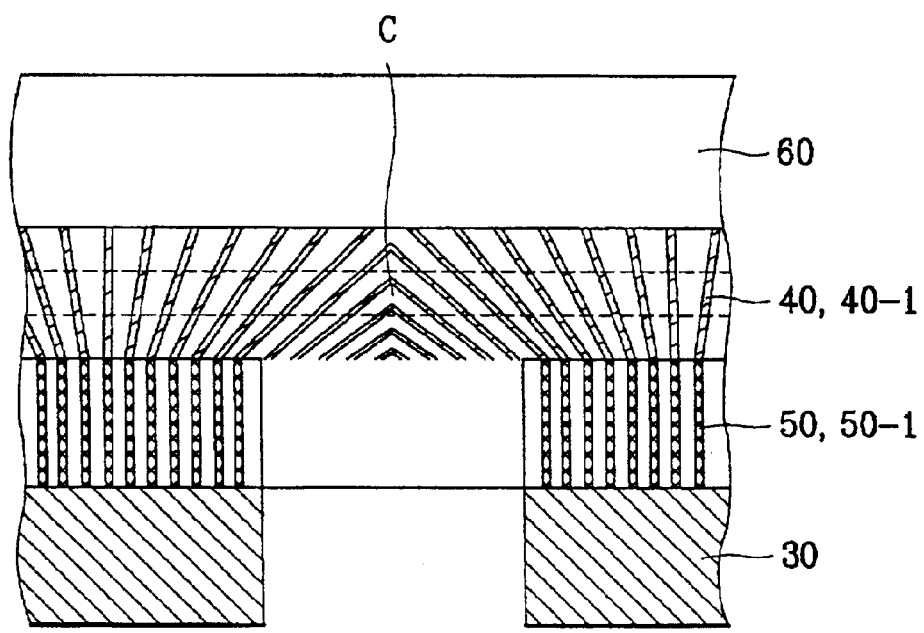
FIG. 4 is an enlarged view of a portion "B" of FIG. 2 of an exemplary liquid crystal display device according to the present invention.

FIG. 4 is an enlarged view of a portion "B" of FIG. 2 of an exemplary liquid crystal display device according to the present invention. In FIG. 4, a gate pad 40 and a data pad 40-1 may be formed at one end of gate lines and data lines of a pixel region 60. In a case where the pad is the gate pad 40, the data pad 40-1 may be formed to cross the gate pad 40. Conversely, in a case where the pad is the data pad 40-1, the gate pad may be formed to cross the data pad 40-1.

A dummy portion having a same pattern as a pattern of the pads may be formed in a region C between the pads 40 or 40-1. Accordingly, the dummy portion may be formed only in a region between respective gate pads in a same pattern as a pattern of the gate pad. Alternatively, the dummy portion may be formed only in a region between respective data pads in a same pattern as a pattern of the data pad. Moreover, the dummy portion may be formed in regions between respective gate pads and between respective data pads. Furthermore, the dummy portion may have a same height as a height of the pads, thereby improving a step difference.

An alignment film of a polyimide or polyamide based material may be formed on an entire surface of the first substrate. A black matrix layer, a color filter layer, and a common electrode may be formed on the second substrate. The alignment film may be formed on an entire surface of a second substrate.

A method for manufacturing the liquid crystal display device according to the present invention will now be described with reference to FIGS. 6A to 6G.

Figure 6A:
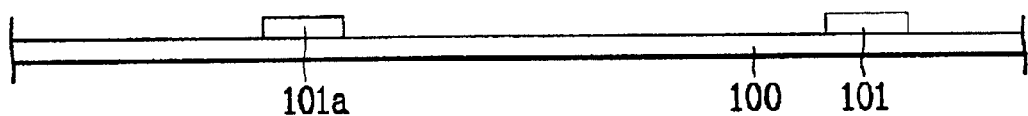
FIGS. 6A to 6G are cross sectional views of an exemplary process of manufacturing a liquid crystal display device according to the present invention.

FIGS. 6A to 6G are cross sectional views of an exemplary process of manufacturing a liquid crystal display device according to the present invention. In FIG. 6A, a metal such as Al, Al alloy, Mo/Al, or Cr/Al, for example, may be deposited on a substrate 100 by a sputtering method, for example, and patterned by a photolithographic process to form a gate electrode 101a, a gate line 101, a gate pad (not shown) at an end of the gate line 101, and a dummy portion having a same pattern as a pattern of the gate pad between respective gate pads.

Figure 6B:
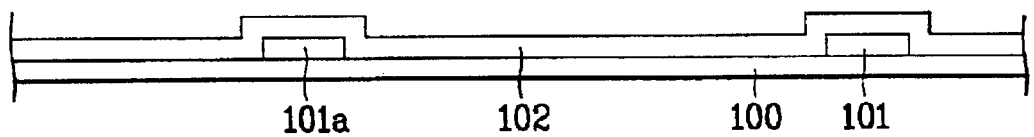

In FIG. 6B, a gate insulating film 102 of $SiN_X$ or $SiO_X$, for example, may be formed on an entire surface of the substrate 100 by a plasma chemical vapor deposition method, for example.

Figure 6C:
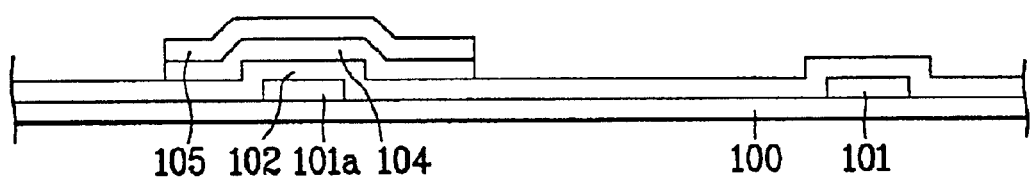

In FIG. 6C, a semiconductor layer 104 and an ohmic contact layer 105 may be formed on the gate insulating film 102 by a plasma chemical vapor deposition process and a photolithographic process, for example. Moreover, the gate insulating film 102, the semiconductor layer 104, and the ohmic contact layer 105 may successively be formed.

Figure 6D:
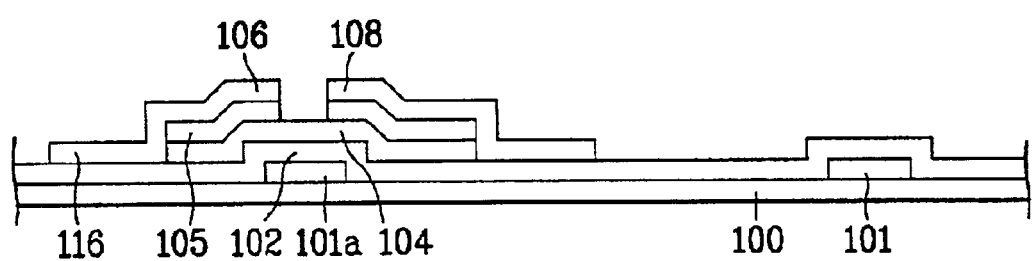

In FIG. 6D, a metal such as Al, Cr, Ti, or Al alloy, for example, may be deposited on the substrate 100 by a sputtering method and patterned by a photolithographic process, for example, thereby forming a source electrode 106 and a drain electrode 108, the data line crossing the gate line, and the data pad at one end of the data line.

Figure 6E:
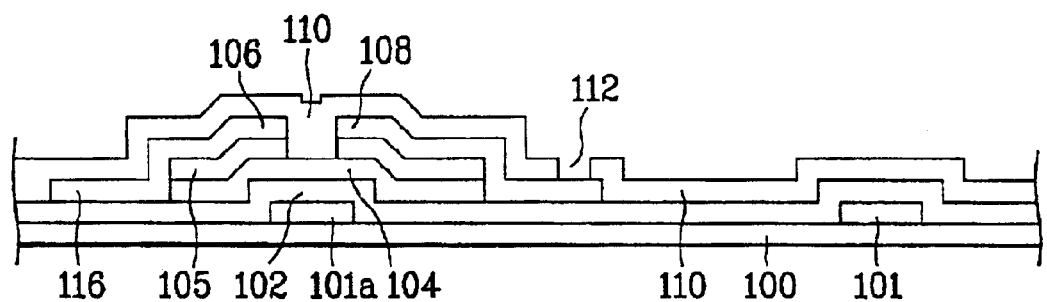

In FIG. 6E, a passivation film 110 of $SiN_X$ or $SiO_X$, for example, may be formed on an entire surface of the substrate 100, and partially etched to form a contact hole 112.

Figure 6F:
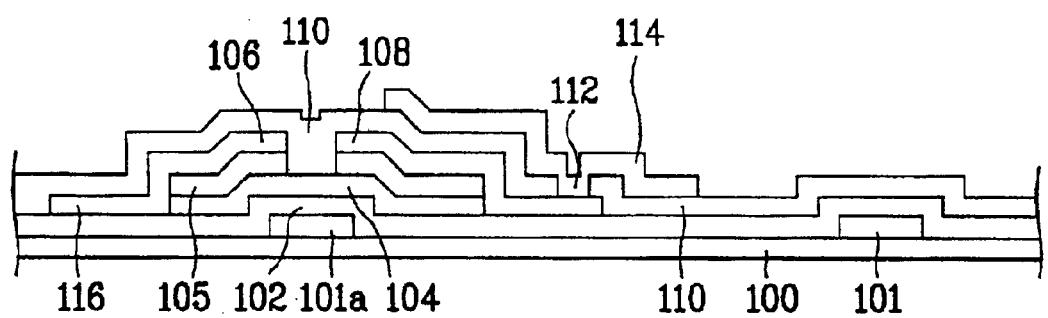

In FIG. 6F, a pixel electrode 114 may be formed to be electrically connected to the drain electrode 108 via a contact hole 112.

Figure 6G:
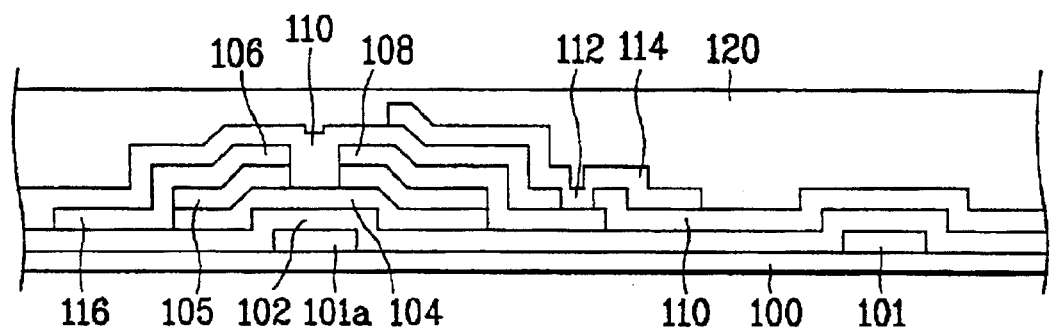

In FIG. 6G, a polyimide or polyamide based material may be deposited on an entire surface of the substrate 100, and hardened. Then, the material may be rubbed with a rubbing cloth attached to a rotating drum, thereby forming an alignment film 120 having a fine groove. Accordingly, a step difference between a region where pads are formed and a region where no pads are formed is improved by the dummy portion formed in the region between the pads. Thus, no abnormal portion is formed in the rubbing cloth during the rubbing process, and the alignment film 120 has a uniform surface.

The dummy portion may have a same pattern as a pattern of the data pad, and may be formed in the region between the data pads in the process of FIG. 6D without being formed in the region between the gate pads in the process of FIG. 6A. In addition, the dummy portion may have a same pattern as a pattern of the pads, and may be formed in the regions between the data pads and between the gate pads. Moreover, the dummy portion may have a same height as a height of the pads.

In addition to the process of manufacturing one substrate for the liquid crystal display device, a process of manufacturing an opposing substrate may be performed. Accordingly, a black matrix layer may be formed on the opposing substrate, a color filter layer may be formed on the black matrix layer, and a common electrode may be formed on the color filter layer, thereby forming the opposing substrate.

Afterwards, the two substrates are attached to each other, and a liquid crystal layer is formed between the two substrates, thereby completing one liquid crystal display device.

The aforementioned method is applicable to an in-plane switching mode, a ferroelectric liquid crystal (FLC) mode, a polysilicon (Poly-Si) mode, and an optically compensated birefringence (OCB) mode, for example, in addition to a general TN mode.

It will be apparent to those skilled in the art that various modifications and variations can be made in the liquid crystal display device and method for manufacturing a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a plurality of gate lines and a plurality of data lines on the first substrate;
   a plurality of gate pads, each gate pad disposed at a first end of each gate line;
   a plurality of data pads, each data pad disposed at a first end of each data line;
   a dummy portion between the pads, the dummy portion having a same pattern as a pattern of the plurality of gate pads and a pattern of the plurality of data pads; and
   a liquid crystal layer between the first and second substrates,
   wherein the dummy portion is electrically disconnected from one of adjacent data pads and adjacent gate pads.

2. The device according to claim 1, wherein the dummy portion is formed in regions between the plurality of gate pads.

3. The device according to claim 2, wherein the dummy portion has a height similar to a height of the plurality of gate pads.

4. The device according to claim 1, wherein the dummy portion is formed in regions between the plurality of data pads.

5. The device according to claim 4, wherein the dummy portion has a height similar to a height of the plurality of data pads.

6. The device according to claim 1, wherein the dummy portion is formed between the plurality of gate pads and the plurality of data pads.

7. The device according to claim 6, wherein the dummy portion has a height similar to a height of the plurality of gate pads and a height of the plurality of data pads.

8. The device according to claim 1, further comprising a thin film transistor at a cross point of the gate and data lines.

9. The device according to claim 8, wherein the thin film transistor includes:
   a gate electrode on the first substrate;
   a gate insulating film on the gate electrode;
   a semiconductor layer on the gate insulating film;
   an ohmic contact layer on the semiconductor layer; and
   a source electrode and a drain electrode on the ohmic contact layer.

10. The device according to claim 1, further comprising a first alignment layer on the first substrate.

11. The device according to claim 1, further comprising:
    a black matrix layer on the second substrate;
    a color filter layer on the second substrate; and
    a second alignment layer on the color filter layer.

12. A method for manufacturing a liquid crystal display device, comprising:
    forming a gate electrode, a plurality of gate lines, a plurality of gate pads, and dummy portions on a first substrate, each dummy portion having a pattern similar to a pattern of the plurality of gate pads in a region between the plurality of gate pads;
    forming a gate insulating film on the first substrate;
    forming a semiconductor layer and an ohmic contact layer on the gate insulating film;
    forming source and drain electrodes, a plurality of data lines, and a plurality of data pads on the first substrate;
    forming a passivation film on the first substrate;
    forming a pixel electrode on the passivation film; and
    forming a first alignment layer on the first substrate,
    wherein each of the dummy portions are electrically disconnected from one of adjacent data pads and adjacent gate pads.

13. The method according to claim 12, wherein the dummy portion has a height similar to a height of the plurality of gate pads.

14. The method according to claim 12, wherein forming of a source and drain electrode, a plurality of data lines and a plurality of data pads includes forming a plurality of dummy portions having a pattern similar to a pattern of the plurality of data pads in a region between the plurality of data pads.

15. The method according to claim 14, wherein the plurality of dummy portions have a height similar to a height of the plurality of data pads.

16. The method according to claim 12, wherein the pixel electrode is electrically connected to the drain electrode.

17. The method according to claim 12, further comprising:
- forming a black matrix layer, a color filter layer, and a second alignment layer on a second substrate;
- attaching the first and second substrates; and
- forming a liquid crystal layer between the first and second substrates.

18. A method for manufacturing a liquid crystal display device, comprising:
- forming a gate electrode, a plurality of gate lines, and a plurality of gate pads on a first substrate;
- forming a gate insulating film on an entire surface of the first substrate;
- forming a semiconductor layer and an ohmic contact layer on the gate insulating film;
- forming a source and drain electrode, a plurality of data lines crossing the plurality of gate lines, a plurality of data pads, and a plurality of dummy portions, each dummy portion having a pattern similar to a pattern of the plurality of data pads in regions between the plurality of data pads;
- forming a passivation film on the first substrate;
- forming a pixel electrode on the passivation film; and
- forming a first alignment layer on the first substrate,
- wherein each of the dummy portions are electrically disconnected from one of adjacent data pads and adjacent gate pads.

19. The method according to claim 18, wherein the plurality of dummy portions have a height similar to a height of the plurality of data pads.

20. The method according to claim 18, wherein the pixel electrode is electrically connected to the drain electrode.

21. The method according to claim 18, further comprising:
- forming a black matrix layer, a color filter layer, and a second alignment layer on a second substrate;
- attaching the first and second substrates; and
- forming a liquid crystal layer between the first and second substrates.

* * * * *